United States Patent [19]
Holzapfel et al.

[11] Patent Number: 5,739,911
[45] Date of Patent: Apr. 14, 1998

[54] POSITION MEASURING SYSTEM

[75] Inventors: Wolfgang Holzapfel, Obing; Walter Huber, Traunstein, both of Germany

[73] Assignee: Dr. Johannes Heidenhain GmbH, Traunreut, Germany

[21] Appl. No.: 679,201

[22] Filed: Jul. 12, 1996

[30] Foreign Application Priority Data

Jul. 15, 1995 [DE] Germany .................. 195 25 874.6

[51] Int. Cl.$^6$ .................................................. G01B 11/00
[52] U.S. Cl. .................................. 356/375; 250/237 G
[58] Field of Search .............................. 356/373, 374, 356/375; 250/237 G; 33/707

[56] References Cited

U.S. PATENT DOCUMENTS 4,636,076  1/1987  Pettigrew .
4,677,293  6/1987  Michel .
5,061,073  10/1991  Michel .

FOREIGN PATENT DOCUMENTS 34 16 864   11/1985   Germany .

*Primary Examiner*—F. L. Evans
*Attorney, Agent, or Firm*—Brinks Hofer Gilson & Lione

[57] ABSTRACT

A position measuring system having an illuminating device for generating a beam of light. A graduation support is provided with a graduation and a reference marker with a first set of graduation markings, where the graduation support receives the beam of light and generates a second beam of light. A scanning plate moves along a measuring direction and receives the second beam of light and generates a third beam of light, wherein the scanning plate has a second set of graduation markings for scanning the first set of graduation markings of the reference marker. A first photodetector and a second photodetector receive portions of the third beam of light and generate position-dependent electrical signals, wherein either the first set of graduation markings of the reference marker or the second set of graduation markings have a structure which deflects in the measuring direction.

25 Claims, 6 Drawing Sheets

POSITION MEASURING SYSTEM

Applicants claim, under 35 U.S.C. §119, the benefit of priority of the filing date of Jul. 15, 1995, of a German application, Serial Number 195 25 874.6, filed on the aforementioned date, the entire contents of which are incorporated herein by reference.

FIELD OF THE INVENTION

The invention relates to a device for the photo-electrical generation of electrical signals in connection with linear or angular measuring devices with at least one illuminating device, a graduation support with at least one graduation and at least one reference marker with graduation markings, a scanning plate with an arrangement of graduation markings for scanning the graduation markings of the reference marker, and with a plurality of photodetectors for the generation of position-dependent electrical signals.

BACKGROUND OF THE INVENTION

Measuring systems of this type are known. A position measuring system of the type in accordance with the species has been extensively dealt with in German Patent Publication DE 34 16 864 C2.

The problems inherent in such position measuring systems when reference pulses are to be generated have also already been mentioned there and ways of solving them indicated. There, the arrangement of the photodetectors depends on the wavelength of the light as well as on the orientation and the grating parameters of the phase gratings.

A reference marker is distinctly described there which, with the aid of transverse gratings at graduation markings, splits the impinging light beams into two partial light beams, which are differently inclined perpendicularly in respect to the measuring direction. These partial light beams are detected by two photo-elements disposed in the focal plane of the condenser lens, which deliver the desired phase and counter-phase signal. Since both partial light beams essentially scan the same graduation field of the scale, this arrangement can be called a single field reference marker. It is therefore particularly insensitive to soiling. However, in actual use the optical separation between the partial light beams of the reference marker and those on the incremental scanning device, which must be represented by a single condenser lens in small scanning systems, has shown itself to be critical. No partial light beam of the reference marker can be allowed to fall on photo-elements of the incremental scanning device, since this would lead to measurement errors. The partial light beams assigned to the reference marker are deflected perpendicularly in respect to the measuring direction by the transverse gratings located on the measurement representation. Besides the intended ±1st transverse diffraction orders of the transverse gratings, others (0th, ±2nd, ±3rd, ...) are also created in the process, which in actual use can never be completely suppressed. All of these partial light beams of the reference marker illuminate large areas of the focal plane of the condenser lens, so that the arrangement of the photo-elements of the incremental track is difficult, particularly with condenser lenses of short focal length.

It is therefore an object of the invention to disclose a position measuring system with a reference marker which permits single field scanning, and whose partial light beams can be easily separated from the partial light beams of an incremental scanning device.

SUMMARY OF THE INVENTION

The present invention concerns a position measuring system having an illuminating device for generating a beam of light. A graduation support is provided with a graduation and a reference marker with a first set of graduation markings, where the graduation support receives the beam of light and generates a second beam of light. A scanning plate moves along a measuring direction and receives the second beam of light and generates a third beam of light, wherein the scanning plate has a second set of graduation markings for scanning the first set of graduation markings of the reference marker. A first photodetector and a second photodetector receive portions of the third beam of light and generate position-dependent electrical signals, wherein either the first set of graduation markings of the reference marker or the second set of graduation markings have a structure which deflects in the measuring direction.

The advantages achieved with the above aspect of the invention are that it permits single field scanning, and allows partial light beams to be easily separated from the partial light beams of an incremental scanning device.

Advantageous further features of the invention will become apparent from the ensuing detailed description of exemplary embodiments of the invention, taken in conjunction with the drawings.

DESCRIPTION OF THE PREFERRED EMBODIMENTS

Figure 1:
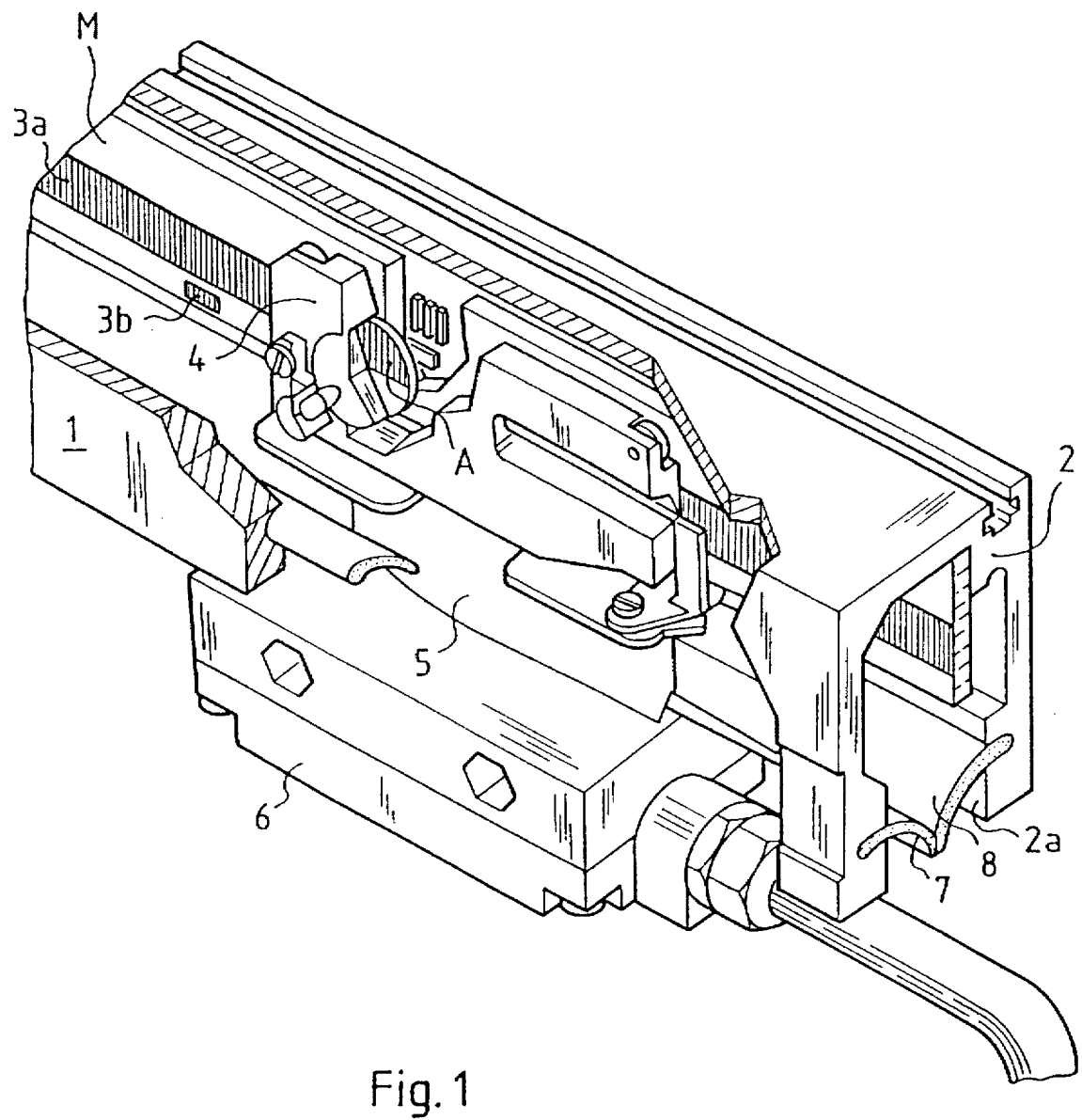
FIG. 1 is a representation of a linear measuring device according to the present invention.

A linear measuring device 1 represented in FIG. 1 essentially consists of a housing 2 of a light metal, in which a graduation support M is fastened in a known manner. The housing 2 has been shown in partial section so that a scanning device 4 is visible. In a manner also known, the scanning device 4 photo-electrically scans a graduation 3a, which has been placed on the graduation support M. A reference marker 3b is assigned to a defined location. A carrier 5 having the cross section of a two-sided sword connects the scanning device 4 with a mounting base 6. The carrier 5 extends through a longitudinal slit 2a of the housing 2, which is sealed by sealing lips 7 and 8, arranged in the shape of a roof.

A machine, not shown, in connection with which it is intended to measure the displacement between the machine base and the carriage, supports the scanning device 4 on the mounting base 6 and the carrier 5, and on the carriage the housing 2 with the graduation support M.

In the subsequent observations, the beam path during scanning of the incremental track is no longer shown and described for the sake of simplicity. However, it is preferably performed with the aid of the same light source and condenser lens.

Figure 2:
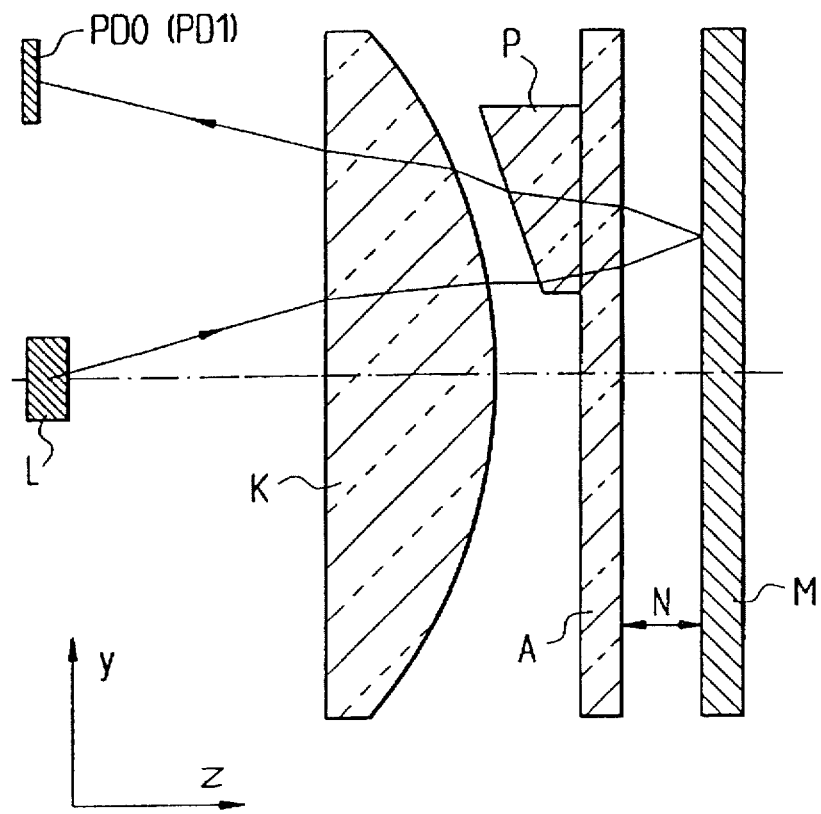
FIG. 2 is an optical layout for reference marker scanning with the linear measuring device of FIG. 1.

An optical layout is schematically represented in FIG. 2. The coordinate directions have been drawn in for better orientation, wherein the measuring direction X extends perpendicularly in respect to the drawing plane.

Figure 5:
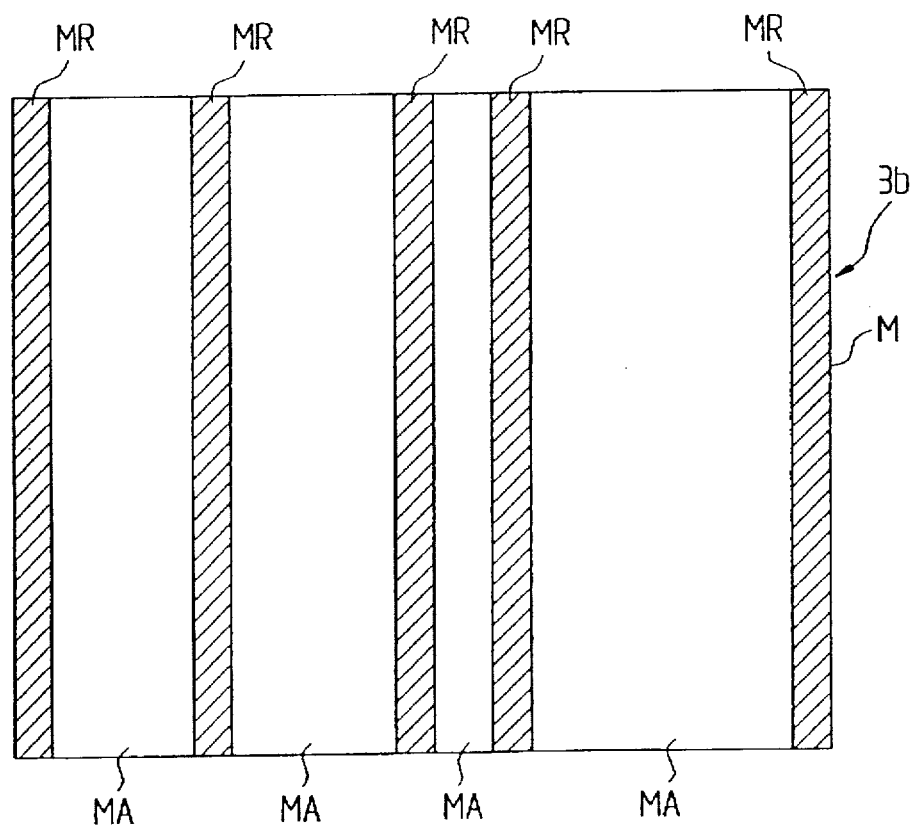
FIG. 5 is a portion of a graduation support with a reference marker to be used with the linear measuring device of FIG. 1.
Figure 6:
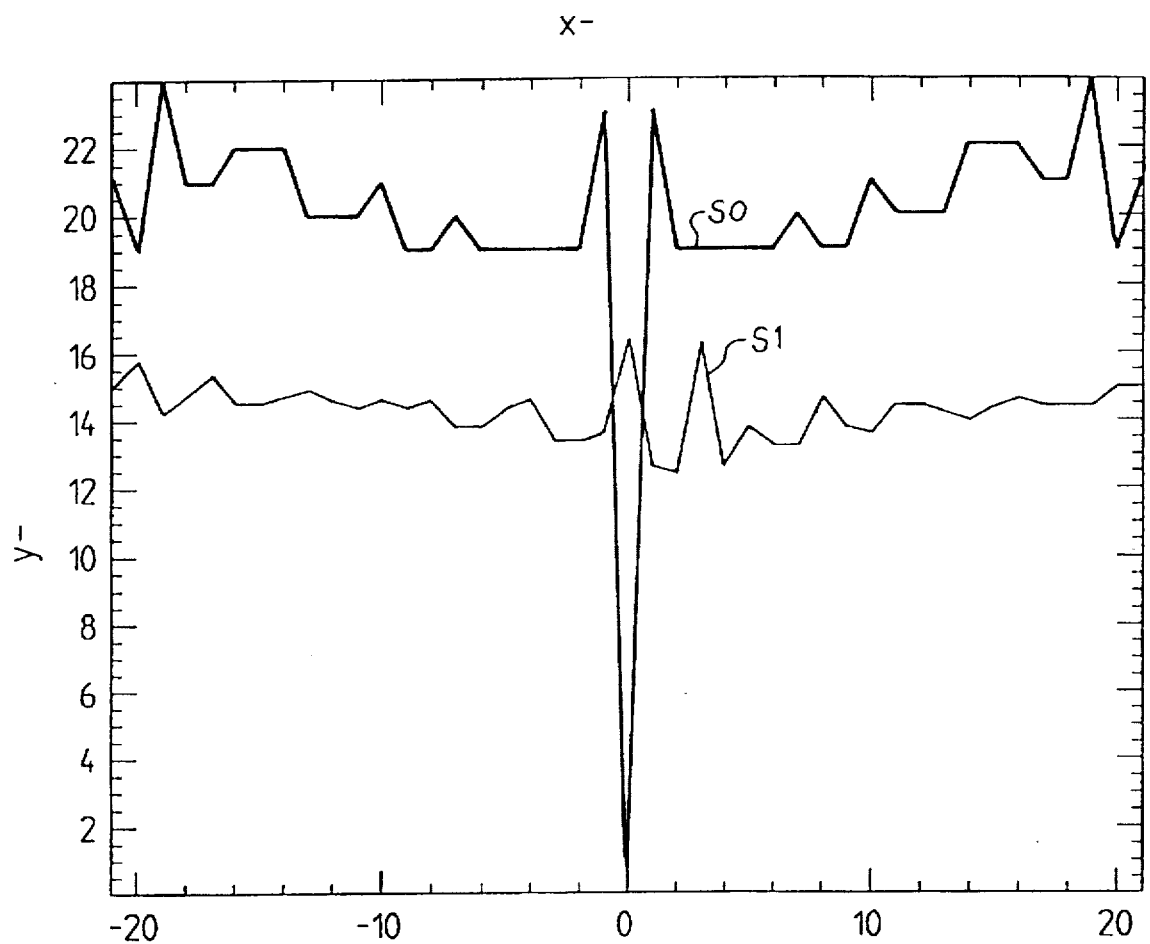
FIG. 6 is a signal shape or diagram generated by the linear measuring device of FIG. 1.

The light from a light source L, preferably an LED or a semiconductor laser, is collimated by a lens K and deflected perpendicularly in respect to the measuring direction X (in the Y direction) by a prism P. It impinges on a scanning plate A which, in accordance with FIG. 4, consists of several tracks S, S' arranged perpendicularly in respect to the measuring direction X and periodically alternating. While the tracks S are transparent, the structured tracks S' contain transparent areas AT between the graduation markings AG, which are embodied as longitudinal gratings AG and are arranged along the measuring direction X similar to the gaps of a conventional reference marker. In this case the longitudinal gratings AG (graduation markings) are embodied as phase gratings, whose bars extend perpendicularly in respect to the measuring direction X and which are embodied in such a way that their 0th. diffraction order is suppressed. The light beam passing through the scanning plate A impinges on the reflection scale M having an arrangement of reflecting graduation markings MR and absorbing (or scattering) areas MA. In this case the distribution of the transparent areas AT of the scanning plate A corresponds to the arrangement of the absorbing areas MA of the reference marker structure 3b of the scale M (FIG. 5). The arrangement or distribution of the reflecting graduation markings MR and the transparent areas AT is selected in a known manner to be such that a scanning signal S0 (FIG. 6) with an extreme is exclusively generated in a zero position.

Figure 3:
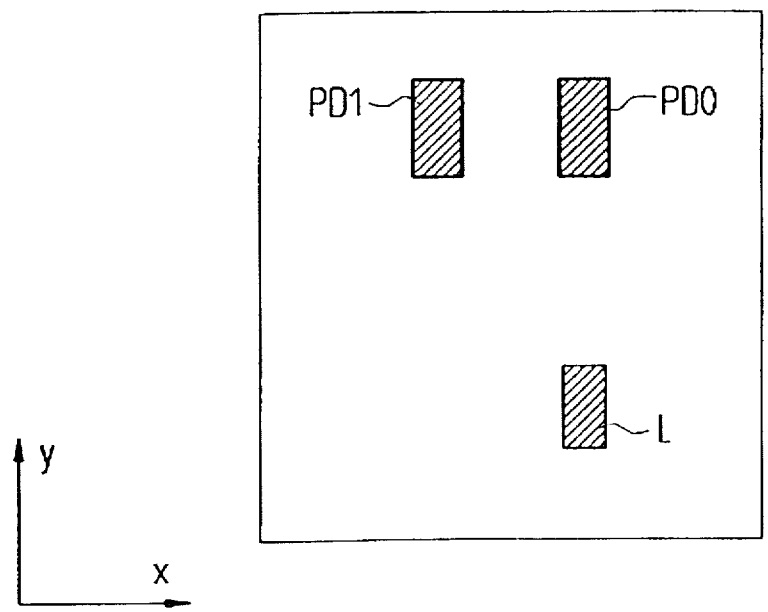
FIG. 3 is a positional layout of the light source and the photo-elements of the optical layout in accordance with the optical layout of FIG. 2.

The light beam reflected by the scale M passes a second time through the scanning plate A and the prism P and is directed by the lens K to two photo-elements PD0 and PD1 (see FIG. 3). In the process, PD0 detects the partial light beam which has only been deflected perpendicularly in respect to the measuring direction by the double prism deflection. The partial light beam detected by PD1 is additionally also diffracted in the first diffraction order in the measuring direction X by the longitudinal gratings AG.

The zero position of the reference marker 3b is first examined, at which the identical arrangements of the absorbing areas MA of the scale M and the transparent areas AT of the scanning plate A are located opposite each other.

The light beam which passes through the transparent tracks S evenly illuminates the scale M in the measuring direction X and is reflected by the graduation markings MR. Since the light beam is inclined perpendicularly in respect to the measuring direction because of the effect of the prism P, it no longer impinges on the track S during its second passage through the scanning plate A, but instead on the structured track S'. The track widths of S and S' are correspondingly selected. The light beam reflected by the graduation markings MR subsequently reaches the longitudinal gratings AG and is deflected in the first (longitudinal) diffraction order. Therefore the light beam falls on the photo-element PD1, which delivers a high phase signal S1 in the zero position. In this position PD0 generates a particularly low counter-phase signal S0.

The light beam, which during the first passage passes through the scanning plate A on the Structured tracks S' and during the second passage on the transparent tracks S, provides similar signal portions. The partial light beam which falls during the first passage on the transparent areas AT is absorbed by the areas MA of the scale M. Only the partial light beam which is first deflected by the longitudinal gratings AG in the first (longitudinal) diffraction order impinges at least partially on the reflecting graduation markings MR of the scale M and is finally guided via the transparent track S on the photo-element PD1. The signal level S1 of this photo-element PD1 is further increased in this manner, while the photo-element PD0 continues to show a low signal level S0.

The prism P for generating the transverse displacement of the light beams on the way in and back is particularly advantageous, because it causes a defined displacement without scattered light. On the way in, L-K-P-A-M, the inclination of the prism angle has been selected such that a light beam which passes through one of the tracks S, passes transversely displaced through one of the other tracks S' on the way back, M-A-P-K-PD, and that a light beam which on the way in passes through one of the tracks S', passes transversely displaced through one of the other tracks S on the way back. The set distance N between the scanning plate A and the scale M is of such a size that at a predetermined prism angle the light beams on the way in and back impinge on the scanning plate A at a distance of R.

Figure 4:
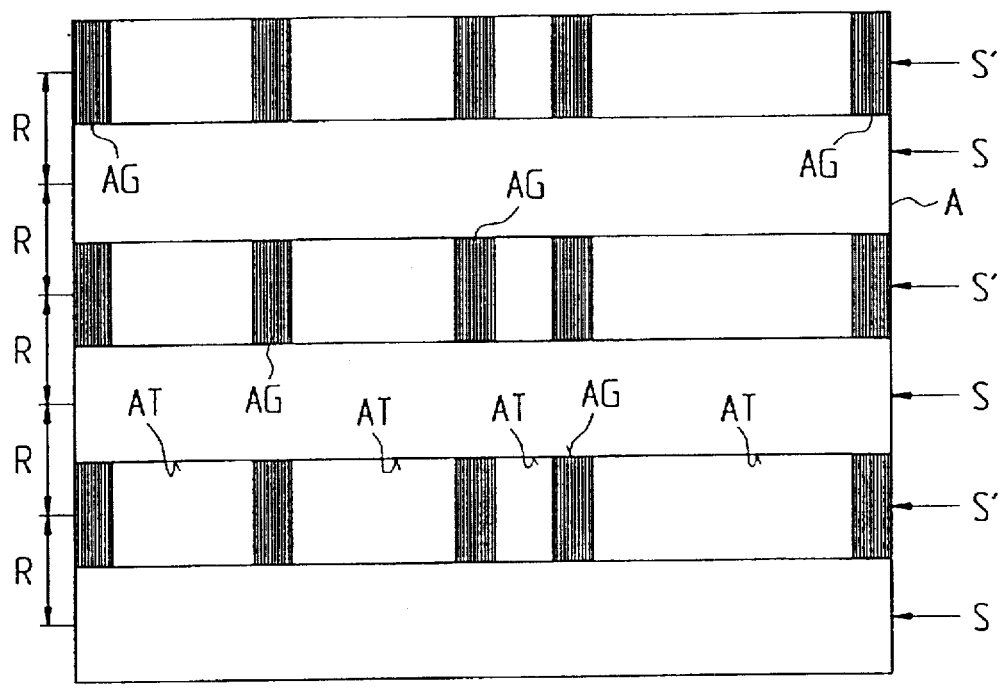
FIG. 4 shows a portion of a scanning plate with the reference marker scanning field to be used with the linear measuring device of FIG. 1.

As can be seen in FIG. 4, the transparent tracks S are broader (in the Y direction) than the tracks S'. This is particularly advantageous for assuring that in case of a change of the distance N, the tracks S' are represented on S, and S on S' without a modulation taking place. Even with a change of the distance N, S' is completely represented on S without an edge cutoff taking place.

Outside of the zero position, a comparatively large amount of light is directed on the photo-element PD0 via the light paths S-MR-AT and AT-MR-S, so that its signal level S0 is increased. Typical signal sequences S0, S1 of the photo-elements PD0 (counter-phase signal) and PD1 (phase signal) are entered in FIG. 6. In this example the phase signal S1 does not have a distinctive maximum at the zero position. The reason for this is that the partial light beam, which during the first passage through the scanning plate A impinges on the longitudinal grating AG, is deflected in the measuring direction X and impinges displaced on the scale M. In this embodiment the relatively weakly modulated phase signal S1 is used for generating a reference level in respect to the strongly modulated counter-phase signal S0 from the same graduation field of the scale M (single field scanning). Such single field scannings are particularly insensitive to soiling, since both signals are evenly reduced in case of soiling. The phase signal S1 and the counter-phase signal S0 are differently crossed in a known manner in order to obtain a reference pulse from the intersection points of both the signals S1 and S0. The reference pulse width can be adjusted by the different amplification of the two signals S0, S1.

Further embodiments are obtained by varying different details:

If the structure of the scale is inverted by interchanging the reflecting graduation markings MR and the absorbing areas MA, with an otherwise identical arrangement the photo-element PD0 supplies a well modulated phase signal, while PD1 generates a slightly modulated counter-phase signal.

Figure 7:
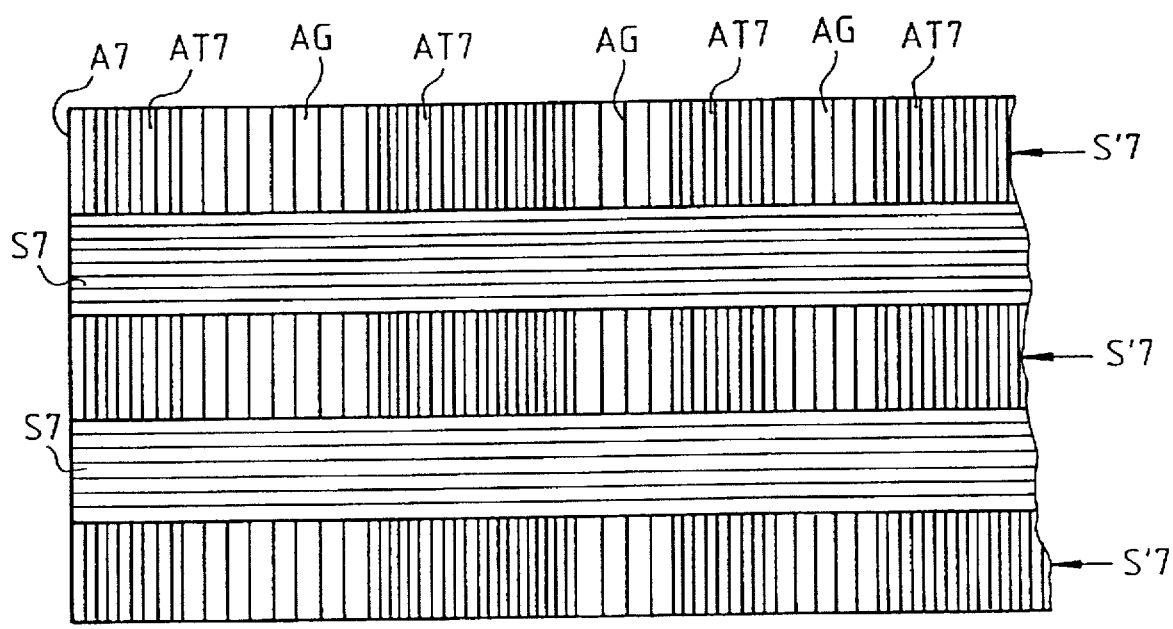
FIG. 7 represents a variant of a reference marker scanning field to be used with the linear measuring device of FIG. 1.

The prism P can be omitted, if in accordance with FIG. 7 the transparent tracks S are replaced by tracks S7 with a transverse grating, whose grating lines essentially extend parallel with the measuring direction X and whose grating constant is dimensioned in such a way that a partial light beam impinging during the first passage falls on the structured tracks S'7 during the second passage. The deflection of the passing light beams perpendicularly to the measuring direction should be such that a good separation in respect to the incremental scanning remains assured. No deflection in the measuring direction X takes place during the first passage (way in) of the light beams through the scanning plate A7, only an exclusively transverse deflection, preferably in the ±1st deflection order at the tracks S7. During the second passage (way out), a deflection in the measuring direction X takes place. In the exemplary embodiment shown, the photo-elements PD1 and PD0 are arranged displaced in the measuring direction X in respect to the light source L. The areas AG of the scanning plate A are provided with a longitudinal grating of a rough grating constant in order to focus the light beams for generating the counter-phase signal on the displaced photo-element PD0. The areas AT7 for generating the phase signal with the aid of the farther displaced photo-element PD1 are provided with a longitudinal grating of a finer grating constant.

If the light source is disposed displaced out of the optical axis, the prism can also be omitted since it is possible by this to create an appropriate beam inclination of the impinging light in the Y direction.

Figure 8:
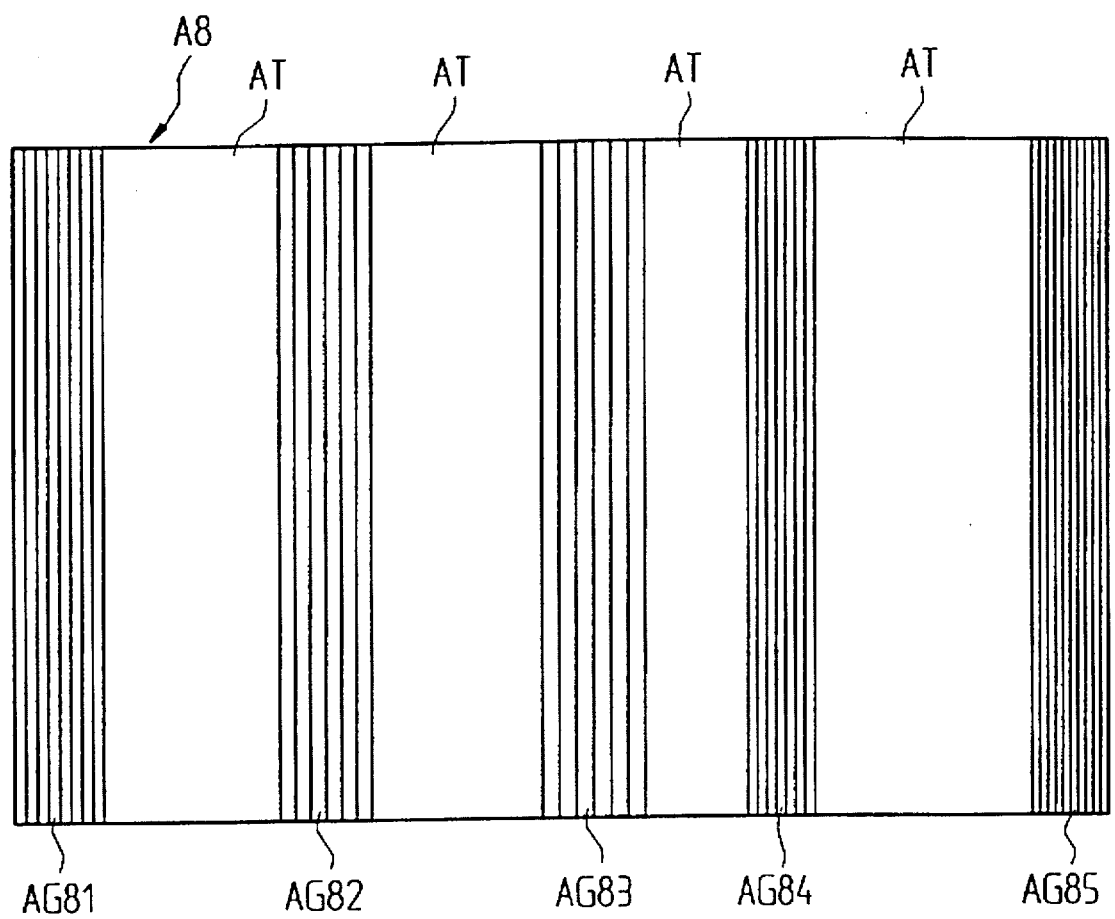
FIG. 8 shows a further variant of a reference marker scanning field to be used with the linear measuring device of FIG. 1.

Structuring with transparent intermediate tracks S or tracks S7 can also be omitted. A light beam which during the first passage through the scanning plate A8 impinges on a graduation marking AG81 in accordance with FIG. 8, should at least not impinge on a graduation marking AG82 to AG85 with the same deflecting properties during the second passage through the scanning plate. Otherwise this light beam would reduce the signal quality of the signal which, for example, is derived from the photo-element D0. In order to achieve this, it is particularly advantageous to provide the individual graduation markings AG81 to AG85 with different properties, such as different longitudinal (X direction) grating constants.

In place of the above described designs of the scanning plate it is also possible to design a reference marker to be structured in accordance with the invention.

The design in accordance with the invention of the reference marker is particularly well applicable in connection with an incremental position measuring system in which the graduation lines have a transverse graduation and the photo-elements for generating phase-shifted scanning signals are transversally displaced above each other. Such a design of the incremental graduation is described in the yet unpublished European Application EP 96 101 181.4.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A position measuring system comprising:
an illuminating device for generating a first beam of light;
a graduation support comprising a graduation and a reference marker with a first set of graduation markings, said graduation support receiving said first beam of light which is reflected on said first set of graduation markings and generating a second beam of light;
a scanning plate comprising a second set of graduation markings moving along a measuring direction for scanning said first set of graduation markings of said reference marker
said scanning plate receiving said second beam of light and generating a third beam of light and a fourth beam of light;
a first photodetector for receiving said third beam of light and a second photodetector for receiving said fourth beam of light and generating position-dependent electrical signals;
wherein said second set of graduation markings have an optical deflecting structure which deflects said third beam of light in said measuring direction.

2. The position measuring system of claim 1, wherein said reference marker and said scanning plate comprise a distribution of deflecting graduation markings arranged spaced apart from each other along said measuring direction.

3. The position measuring system of claim 2, wherein a first portion of said second light beam impinges upon said second set of graduation markings and are deflected towards said first photodetector for generating a first electrical signal; and
wherein a second portion of said second light beam impinges on a space between two graduation markings of said second set of graduation markings and is directed towards said second photodetector for generating a second electrical signal.

4. The position measuring system of claim 3, wherein said space comprises an optical deflecting structure which differs from said optical deflecting structure of said second set of graduation markings.

5. The position measuring system of claim 1, wherein said second set of graduation markings comprise gratings with a plurality of graduation periods per graduation marking.

6. The position measuring system of claim 4, wherein said second set of graduation markings comprise gratings with a plurality of graduation periods per graduation marking.

7. The position measuring system of claim 6, wherein said space comprises gratings which have a grating constant and/or orientation which differs from the graduation markings.

8. The position measuring system of claim 6, wherein said gratings are phase gratings which suppress the zero diffraction order.

9. The position measuring system of claim 7, wherein said gratings are phase gratings which suppress the zero diffraction order.

10. The position measuring system of claim 1, wherein said scanning plate comprises a first set of tracks and a set of intermediate tracks that lie transversely in the measuring direction and alternate with one another.

11. The position measuring system of claim 10, wherein at least one intermediate track is a transparent track.

12. The position measuring system of claim 10, wherein at least one intermediate track has an optical deflecting structure which essentially optically deflects either said first or said second beam of light transversely in respect to said measuring direction.

13. The position measuring system of claim 10, wherein at least one intermediate track is embodied broader transversely to said measuring direction than the at least one track with the graduation markings.

14. The position measuring system of claim 11, wherein at least one intermediate track is embodied broader transversely to said measuring direction than the at least one track with the graduation markings.

15. The position measuring system of claim 12, wherein at least one intermediate track is embodied broader transversely to said measuring direction than the at least one track with the graduation markings.

16. The position measuring system of claim 3, wherein said first light beam is collimated by means of a lens;

said collimated beam is optically deflected by an optical deflection device transversely with respect to said measuring direction and impinges on said reference marker of said graduation support, and the light impinging on reflecting graduation markings of said graduation support is guided as said second beam of light to said second set of graduation markings of said scanning plate having an optical deflecting structure to deflect said third beam of light in said measuring direction;

said light impinging on said reflecting graduation markers is deflected from said graduation markings and is directed onto said first photodetector, and light impinging on said space is directed as said fourth beam of light onto said second photodetector.

17. The position measuring system of claim 16, wherein said deflection device comprises a prism;

wherein said scanning plate comprises a plurality of tracks, wherein at least one track with graduation markings and at least one transparent intermediate tracks alternate transversely to said measuring direction and are disposed at a mutual distance; and wherein said first beam of light and said second beam of light which is reflected from the markings of said graduation support impinge on said scanning plate at said mutual distance.

18. The position measuring system of claim 5, wherein said grating periods of each of said second set of graduation markings differ from each other.

19. The position measuring system of claim 3, wherein said space comprises a transparent area.

20. The position measuring system of claim 1, wherein said scanning plate comprises:

at least a first track that is transparent and does not optically deflect either said first beam of light or said second beam of light; and at least a second track comprising said second set of markings.

21. The position measuring system of claim 1, wherein said scanning plate comprises:

at least a first track with an optically deflecting structure which deflects either said first beam of light or said second beam of light substantially transverse to said measuring direction; and at least a second track with a second set of markings.

22. The position measuring system of claim 16, wherein said scanning plate comprises:

a first track with markings;

a second track with an optically deflecting structure which deflects said first beam of light substantially transverse to said measuring direction;

said first and second tracks alternate transversely to one another along said measuring direction and are separated relative to one another by a mutual distance; and wherein said first beam of light that impinges on said second track is transversely deflected so that said second beam of light which is reflected from said markings of said graduation support impinge on said first track on said scanning plate.

23. The position measuring system of claim 5, wherein said gratings comprise bars that extend perpendicular to said measuring direction.

24. The position measuring system of claim 6, wherein said gratings comprise bars that extend perpendicular to said measuring direction.

25. A position measuring system comprising:

at least one illuminating device for generating a beam of light;

a graduation support comprising at least one graduation and at least one reference marker with a set of markings;

a scanning plate comprising an arrangement of second markings for scanning said set of markings of said reference marker;

a plurality of photodetectors for generating position-dependent electrical signals;

wherein either said set of markings of said graduation support or said arrangement of second markings of said scanning plate have an optical deflecting structure which optically deflects said beam of light in said measuring direction.

* * * * *

UNITED STATES PATENT AND TRADEMARK OFFICE
CERTIFICATE OF CORRECTION

PATENT NO. : 5,739,911
DATED : April 14, 1998
INVENTOR(S) : W. Holzapfel et al.

It is certified that error appears in the above-identified patent and that said Letters Patent is hereby corrected as shown below:

In claim 1, line 12, after "marker" insert --;-- (semicolon).

Signed and Sealed this

Second Day of May, 2000

*Attest:*

Q. TODD DICKINSON

*Attesting Officer*     *Director of Patents and Trademarks*